(12) United States Patent
Okazaki et al.

(10) Patent No.: US 12,151,584 B2
(45) Date of Patent: Nov. 26, 2024

(54) WORKING VEHICLE

(71) Applicant: KUBOTA CORPORATION, Osaka (JP)

(72) Inventors: Kazuto Okazaki, Osaka (JP); Shinichi Kawabata, Osaka (JP); Hiroshi Shimada, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 310 days.

(21) Appl. No.: 17/742,709

(22) Filed: May 12, 2022

(65) Prior Publication Data

US 2022/0363160 A1  Nov. 17, 2022

(30) Foreign Application Priority Data

May 17, 2021 (JP) ................. 2021-083295

(51) Int. Cl.
B60L 53/80 (2019.01)
B60L 50/60 (2019.01)

(52) U.S. Cl.
CPC ............. B60L 53/80 (2019.02); B60L 50/66 (2019.02)

(58) Field of Classification Search
CPC .................... B60L 53/80; B60L 50/66
See application file for complete search history.

(56) References Cited

U.S. PATENT DOCUMENTS

| 8,473,136 B2* | 6/2013 | Kato .................. B60L 50/62 |
| | | 180/65.21 |
| 8,963,457 B2* | 2/2015 | Sugiyama ........... B60L 3/0046 |
| | | 318/440 |
| 9,090,177 B2* | 7/2015 | Okura .................. B60L 58/15 |
| 9,399,407 B2* | 7/2016 | Zhou .................... B60L 50/15 |
| 9,461,482 B2* | 10/2016 | Cheng ................ H02J 7/0016 |
| 9,694,698 B2* | 7/2017 | Ogawa ..................... B60L 3/04 |
| 9,712,101 B2* | 7/2017 | Oi ...................... H02P 27/085 |
| 9,783,185 B2* | 10/2017 | Zhou .................... B60L 58/21 |
| 9,796,289 B2* | 10/2017 | Murase ................ B62J 43/16 |
| 9,878,632 B2* | 1/2018 | Zhou .................... B60L 50/90 |
| 9,889,752 B2* | 2/2018 | Zhou .................... B60L 58/12 |
| 10,076,971 B2* | 9/2018 | Huang ................... H02P 4/00 |

(Continued)

FOREIGN PATENT DOCUMENTS

| JP | 09-144062 A | 6/1997 |
| JP | 10-315885 A | 12/1998 |

(Continued)

OTHER PUBLICATIONS

Notification of Reasons for Rejection issued in the corresponding Japanese Patent Application No. 2021-083295 dated Jan. 9, 2024, along with English translation thereof.

Primary Examiner — Jacob B Meyer

(74) Attorney, Agent, or Firm — Greenblum & Bernstein, P.L.C.

(57) ABSTRACT

A working vehicle includes a vehicle body, a traveling device which supports the vehicle body such that the vehicle body is allowed to travel, an electric motor to drive the traveling device, the electric motor being provided on the vehicle body, and a plurality of batteries to store electric power to be supplied to the electric motor, wherein the plurality of batteries include an on-board battery fixed to the vehicle body and a mobile battery detachably attached to the vehicle body.

10 Claims, 17 Drawing Sheets

(56) References Cited

U.S. PATENT DOCUMENTS

| | | | | |
|---|---|---|---|---|
| 10,164,502 | B1* | 12/2018 | Hirsch | H02K 7/006 |
| 10,232,699 | B2* | 3/2019 | Oyama | B60K 6/26 |
| 10,538,272 | B2* | 1/2020 | Nada | B60R 21/13 |
| 10,846,674 | B2* | 11/2020 | Rayner | H01M 50/247 |
| 10,850,632 | B2* | 12/2020 | Senba | H05K 7/20945 |
| 10,923,924 | B2* | 2/2021 | Kobayashi | H01M 10/4264 |
| 10,992,167 | B2* | 4/2021 | Shinohara | H02J 13/00009 |
| 11,136,008 | B2* | 10/2021 | Lai | B60L 53/305 |
| 11,265,821 | B2* | 3/2022 | Maki | H04W 52/241 |
| 11,400,678 | B2* | 8/2022 | Masato | H02P 6/08 |
| 11,404,888 | B2* | 8/2022 | Isaksson | B60L 53/22 |
| 2009/0096410 | A1* | 4/2009 | Sakurai | B60L 58/20 |
| | | | | 320/109 |
| 2010/0138087 | A1 | 6/2010 | Takaoka | |
| 2015/0266386 | A1 | 9/2015 | Matsuda et al. | |
| 2018/0248388 | A1 | 8/2018 | Takatsuka et al. | |
| 2022/0363160 | A1* | 11/2022 | Okazaki | B60L 58/20 |

FOREIGN PATENT DOCUMENTS

| | | |
|---|---|---|
| JP | 2003-40057 A | 2/2003 |
| JP | 2008-295159 A | 12/2008 |
| JP | 3159819 U | 5/2010 |
| JP | 2015-09694 A | 1/2015 |
| JP | 2017-93258 A | 5/2017 |
| JP | 3220871 U | 4/2019 |
| WO | 2014/061052 A1 | 4/2014 |

* cited by examiner

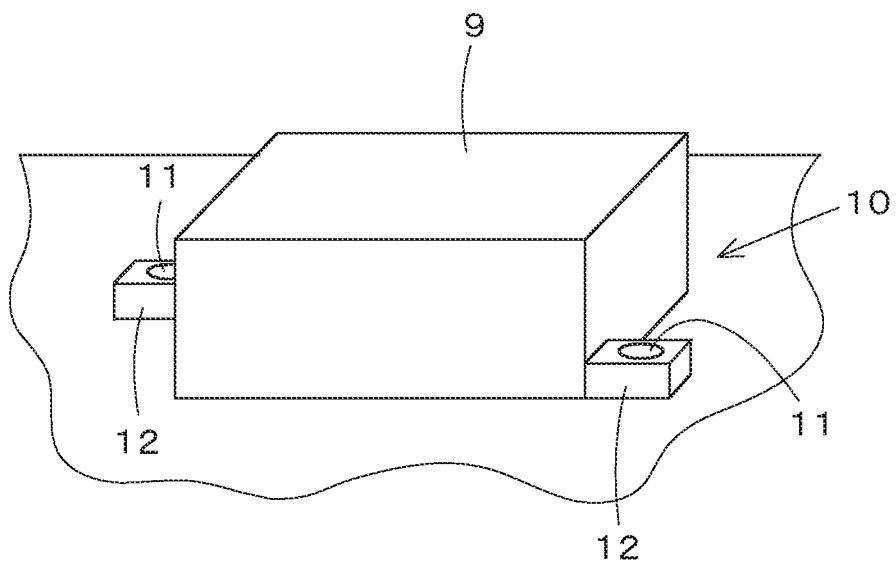

WORKING VEHICLE

CROSS-REFERENCE TO RELATED APPLICATIONS

This application claims the benefit of priority to Japanese Patent Application No. 2021-083295 filed on May 17, 2021. The entire contents of this application are hereby incorporated herein by reference.

BACKGROUND OF THE INVENTION

1. Field of the Invention

The present disclosure relates to a working vehicle driven by an electric motor.

2. Description of the Related Art

An example of a known working vehicle driven by an electric motor is a working vehicle disclosed in Japanese Utility Model Registration No. 3220871 (Patent Literature1).

The working vehicle includes a traveling machine body with left and right traveling devices driven by respective left and right electric motors, in which the left and right electric motors are disposed at one of the opposite ends of the traveling machine body in a front-rear direction, and a control device and a battery to drive the left and right electric motors are disposed at the other of the opposite ends of the traveling machine body in the front-rear direction.

SUMMARY OF THE INVENTION

In the case of the working vehicle as described above, it is difficult to mount a high-capacity battery because of the limited space available, resulting in low battery capacity and short battery run time. On the other hand, if a high-capacity battery is mounted, although battery run time increases, the vehicle body becomes more costly than engine-driven vehicles.

Preferred embodiments of the present disclosure provide electric motor-driven working vehicles in each of which a balance between achieving a battery capacity and reducing the cost for the vehicle body can be adjusted according to a user's needs and/or the like.

A technical solution to attain the above working vehicles is characterized by the following points.

In an aspect, a working vehicle includes a vehicle body, a traveling device which supports the vehicle body such that the vehicle body is allowed to travel, an electric motor to drive the traveling device, the electric motor being provided on the vehicle body, and a plurality of batteries to store electric power to be supplied to the electric motor, wherein the plurality of batteries include an on-board battery fixed to the vehicle body and a mobile battery detachably attached to the vehicle body.

The working vehicle may further include a switching mechanism. The switching mechanism may be configured to be selectively placed in a first state in which electric power is supplied from the on-board battery to the electric motor or a second state in which electric power is supplied from the mobile battery to the electric motor.

The switching mechanism may include a first output connector electrically connected to the on-board battery. The switching mechanism may include a second output connector electrically connected to the mobile battery. The switching mechanism may include an input connector electrically connected to the electric motor. The input connector may be configured to be selectively connected to the first output connector or the second output connector.

The switching mechanism may include a junction cable for supply of electric power from the second output connector to the input connector. A plurality of the mobile batteries may be detachably attached to the vehicle body. The plurality of mobile batteries may be provided with a respective plurality of the second output connectors. The junction cable may be provided with a first junction connector and a plurality of second junction connectors, the first junction connector being configured to be connected to the input connector, the plurality of second junction connectors being configured to be connected to the respective plurality of second output connectors.

The switching mechanism may include a first output cable electrically connected to the on-board battery. The switching mechanism may include a second output cable configured to be electrically connected to the mobile battery. The switching mechanism may include a supply cable electrically connected to the electric motor. The switching mechanism may include a relay configured to be selectively placed in a first connection state in which the relay electrically connects the first output cable and the supply cable to each other or a second connection state in which the relay electrically connects the second output cable and the supply cable to each other.

A plurality of the mobile batteries may be detachably attached to the vehicle body. The second output cable may be configured to be electrically connected to the plurality of mobile batteries.

A plurality of the mobile batteries may be detachably attached to the vehicle body. The plurality of mobile batteries may include a first mobile battery and a second mobile battery. The switching mechanism may include a plurality of the second output cables including a first cable configured to be electrically connected to the first mobile battery and a second cable configured to be electrically connected to the second mobile battery. The relay may be configured to be selectively placed in a first form of the second connection state in which the relay electrically connects the first cable and the supply cable to each other or a second form of the second connection state in which the relay electrically connects the second cable and the supply cable to each other.

The working vehicle may further include one or more mounts to have one or more of the mobile batteries detachably attached thereto. The one or more mounts may be disposed at at least one of: a position in front of the vehicle body; a position behind the vehicle body; a position inside a hood on the vehicle body; a position below a seat on the vehicle body; a roof above the seat; an upper portion of a cargo bed on the vehicle body; and a position below the cargo bed.

The first mobile battery may be detachably attached to an upper portion of a cargo bed on the vehicle body. The second mobile battery may be detachably attached to a position other than the upper portion of the cargo bed. The relay may be placed in the first form of the second connection state when battery power remaining in the first mobile battery is equal to or greater than a predetermined level. The relay may be placed in the second form of the second connection state when the battery power remaining in the first mobile battery is less than the predetermined level.

The first mobile battery may be detachably attached to a position inside a hood on the vehicle body. The second mobile battery may be detachably attached to a position not inside the hood. The relay may be placed in the first form of the second connection state when battery power remaining in the first mobile battery is equal to or greater than a predetermined level. The relay may be placed in the second form of the second connection state when the battery power remaining in the first mobile battery is less than the predetermined level.

The first mobile battery may be detachably attached closer to the on-board battery than the second mobile battery is to the on-board battery. The relay may be placed in the first form of the second connection state when battery power remaining in the first mobile battery is equal to or greater than a predetermined level, and placed in the second form of the second connection state when the battery power remaining in the first mobile battery is less than the predetermined level.

The working vehicle may further include a controller configured or programmed to control operation of the relay. The controller may be configured or programmed not to switch the relay between the first connection state and the second connection state while the traveling device is driven.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 13B illustrates another example of a method of attaching a mobile battery.

DETAILED DESCRIPTION OF THE EMBODIMENTS

Figure 1:
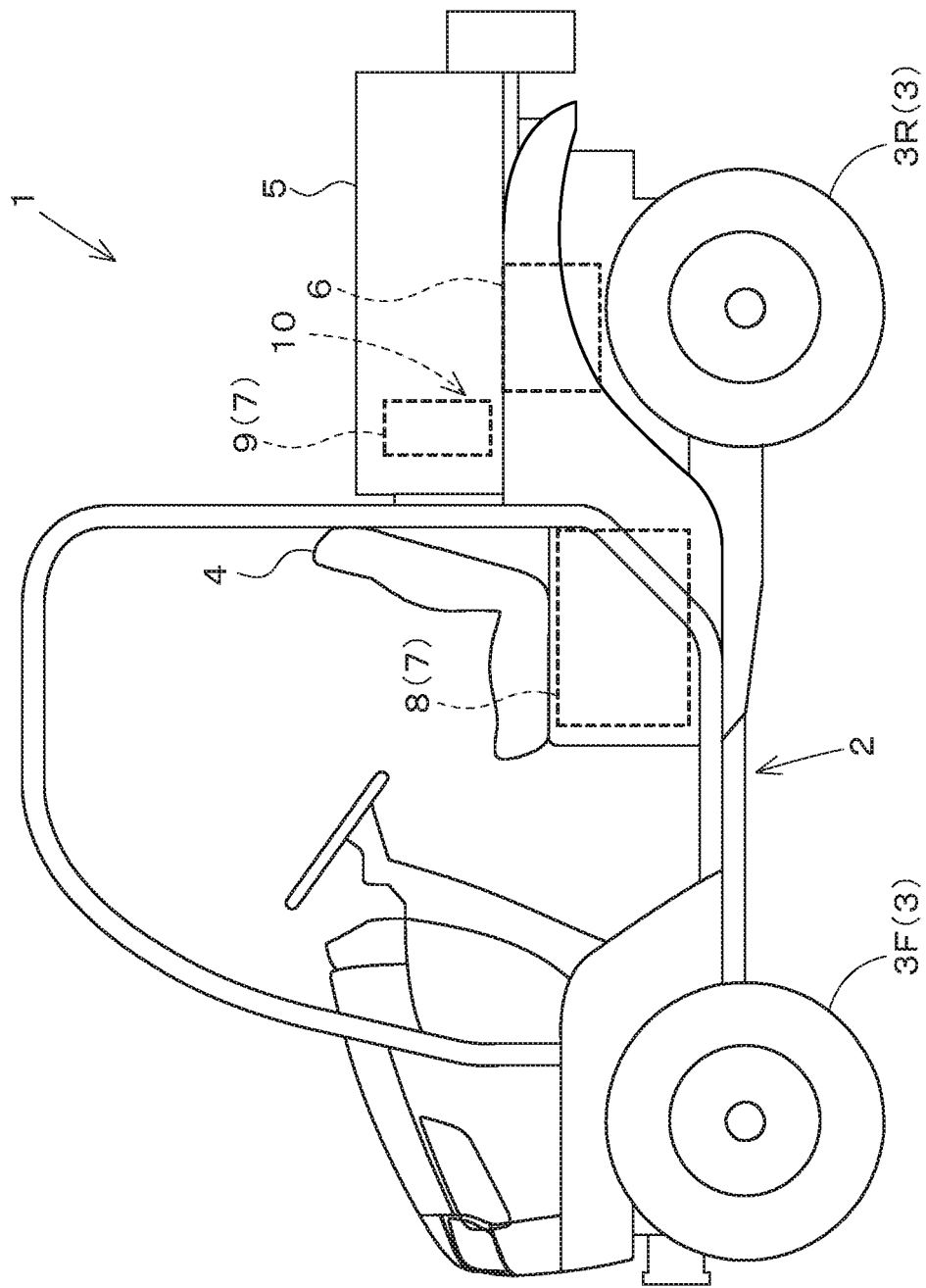
FIG. 1 is a side view of a utility vehicle as an example of a working vehicle according to the present invention.

The preferred embodiments will now be described with reference to the accompanying drawings, wherein like reference numerals designate corresponding or identical elements throughout the various drawings. The drawings are to be viewed in an orientation in which the reference numerals are viewed correctly.

The following description discusses preferred embodiments of a working vehicle according to the present invention.

FIG. 1 is a side view of a working vehicle 1 according to an embodiment of the present invention.

FIG. 1 illustrates a utility vehicle (multipurpose work vehicle) as an example of the working vehicle 1. A utility vehicle is a working vehicle for use in various types of work such as agricultural work, transportation work, and/or the like.

Note, however, that the working vehicle according to an embodiment of the present invention is not limited to a utility vehicle, and may be, for example, a tractor, a backhoe, a loader working machine (such as a wheel loader, a compact track loader, or a skid-steer loader), or the like.

The working vehicle 1 includes a vehicle body 2 and a traveling device 3 which supports the vehicle body 2 such that the vehicle body 2 is allowed to travel.

The vehicle body 2 includes a seat 4 for an operator and a cargo bed 5 for placement of objects. The cargo bed 5 is provided at the rear of the vehicle body 2 (rearward of the seat 4). The cargo bed 5 can be tilted by raising its front portion by driving dump cylinder(s) (not illustrated).

The traveling device 3 includes front wheels 3F provided at the front of the vehicle body 2 and rear wheels 3R provided at the rear of the vehicle body 2. The front wheels 3F are provided at the respective left and right sides of the vehicle body 2, and the rear wheels 3R are provided at the respective left and right sides of the vehicle body 2. That is, the traveling device 3 includes four wheels.

The vehicle body 2 is equipped with an electric motor 6 to drive the traveling device 3. The electric motor 6 is disposed below the cargo bed 5. Power from the electric motor 6 is transmitted to the front wheels 3F and the rear wheels 3R. That is, the working vehicle 1 in the present embodiment is a four-wheel-drive working vehicle. Note, however, that the working vehicle 1 may be a rear-wheel-drive working vehicle or a front-wheel-drive working vehicle.

The vehicle body 2 is provided with a plurality of batteries 7 to store electric power to be supplied to the electric motor 6. The plurality of batteries 7 include an on-board battery 8 fixed to the vehicle body 2 and a mobile battery 9 detachably attached to the vehicle body 2.

The on-board battery 8 is fixed to the vehicle body 2. The on-board battery 8 is usually not detached from the vehicle body 2, but can be detached from the vehicle body 2 for repair or replacement. The on-board battery 8 is disposed below the seat 4. The on-board battery 8 is a battery pack including a plurality of battery modules.

The mobile battery 9 is detachably attached to a mount 10 on the vehicle body 2.

Figure 13A:
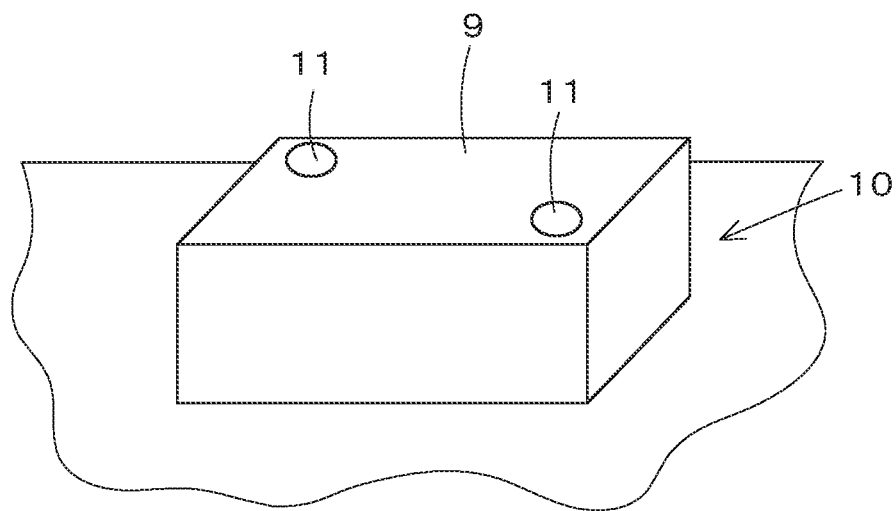
FIG. 13A illustrates an example of a method of attaching a mobile battery.

The mobile battery 9 can be attached to the mount 10 with, for example, one or more screws. FIGS. 13A and 13B illustrate examples of a method of attaching the mobile battery 9. FIGS. 13A and 13B each illustrate a method of attaching the mobile battery 9 using two or more screws 11. In the example in FIG. 13A, two corners of the mobile battery 9 in the shape of a cuboid diagonally opposite each other in plan view are fixed to the mount 10 with screws 11. In the example in FIG. 13B, two corners of the mobile battery 9 in the shape of a cuboid diagonally opposite each other in plan view have protrusions 12, and the protrusions 12 are fixed to the vehicle body 2 with screws 11. In such examples, the mobile battery 9 can be detached from the mount 10 by removing the screws 11. Note, however, that the method of attaching the mobile battery 9 is not limited to methods using screws. For example, the mobile battery 9 may be detachably attached to the mount 10 by, for example, being fitted in/on or engaged with the mount 10.

As illustrated in FIG. 1, in the present embodiment, the mount 10 is provided on an upper portion of the cargo bed 5 (specifically, on an upper front portion of the cargo bed 5). The mobile battery 9 is therefore attached to the upper portion of the cargo bed 5 (specifically, on the upper front portion of the cargo bed 5). Note, however, that the location of the mount 10 is not limited to the upper portion of the cargo bed 5, and may be changed as appropriate. The working vehicle 1 may include one or more mounts 10.

The mobile battery 9 is smaller and lighter than the on-board battery 8, and therefore is less restricted in terms of its location than the on-board battery 8. Therefore, the mobile battery 9 can be attached at locations where the on-board battery 8 is difficult to attach. It is also easy to attach a plurality of the mobile batteries 9 to a plurality of mounts 10.

The mobile battery 9 is attached to and detached from the vehicle body 2 as needed also for purposes other than repair and replacement, unlike the on-board battery 8. Therefore, the mobile battery 9 is attached to the mount 10 so that the mobile battery 9 can be more easily detached from the vehicle body 2 than the on-board battery 8.

The mobile battery 9 is a battery pack including a single battery module or a battery pack including a plurality of battery modules. The number of battery modules of the mobile battery 9 is less than the number of battery modules of the on-board battery 8. Therefore, the mobile battery 9 is smaller and lighter than the on-board battery 8. This makes it possible for an operator to easily carry the mobile battery 9.

The number of mobile batteries 9 attached to the vehicle body 2 may be one or more. It is preferable that a plurality of the mobile batteries 9 be attached to the vehicle body 2. In the case where a plurality of the mobile batteries 9 are attached to the vehicle body 2, two or more of the plurality of mobile batteries 9 may be attached to a single mount 10. Alternatively, two or more of the plurality of mobile batteries 9 may be attached to two or more mounts 10.

In the case where a plurality of the mobile batteries 9 are attached to the vehicle body 2, for example, the following can be achieved: each of the plurality of mobile batteries 9 has a lower capacity than the on-board battery 8, but the total capacity of the plurality of mobile batteries 9 is higher than that of the on-board battery 8.

All the plurality of mobile batteries 9 may have the same capacity. One or more of the plurality of mobile batteries 9 may have a different capacity. The plurality of mobile batteries 9 may have respective different capacities. The same applies to First to Fourth Examples (FIGS. 2 to 4 and 7) described later.

The mobile battery 9 is used in priority to the on-board battery 8. When the battery power remaining in the mobile battery 9 is equal to or greater than a predetermined level, the mobile battery 9 is used. When the battery power remaining in the mobile battery 9 is less than the predetermined level, the on-board battery 8 is used. Since the mobile battery 9 that can be detachably attached to the vehicle body 2 is prioritized, it is possible to easily do the work of replacing batteries. Using the mobile battery 9 and using the on-board battery 8 can be switched manually or automatically by a switching mechanism 13 (described later).

The working vehicle 1 may be equipped with an electric power generator. The electric power generated by the electric power generator may be supplied to the electric motor 6 and may be used to charge the on-board battery 8 and/or the mobile battery 9. Note, however, that the electric power generator does not need to be provided on the working vehicle 1, and may be located at a different place (such as a charging station and/or a parking area).

The working vehicle 1 includes a switching mechanism 13 which is configured to be selectively placed in a first state in which electric power is supplied from the on-board battery 8 to the electric motor 6 or a second state in which electric power is supplied from the mobile battery(batteries) 9 to the electric motor 6.

Figure 2:
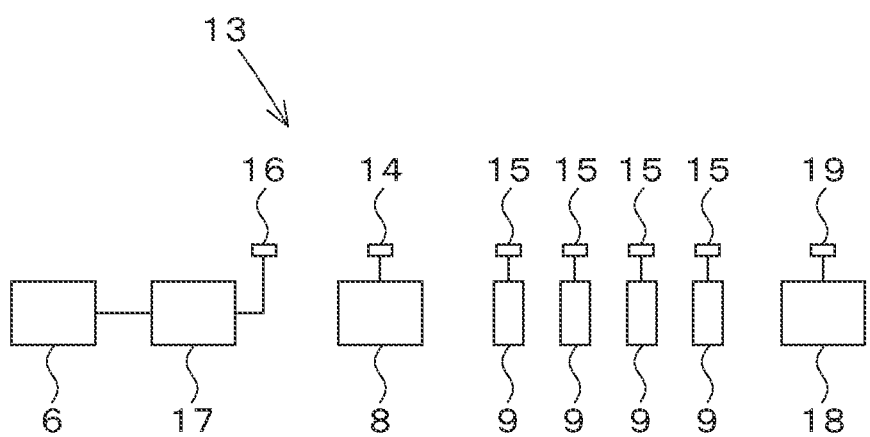
FIG. 2 illustrates a switching mechanism of First Example.

FIG. 2 illustrates a switching mechanism 13 of First Example.

The switching mechanism 13 of First Example includes a first output connector 14, second output connectors 15, and an input connector 16.

The first output connector 14 is electrically connected to the on-board battery 8. The second output connectors 15 are electrically connected to a plurality of mobile batteries 9. The second output connectors 15 are provided to the respective plurality of mobile batteries 9.

The input connector 16 is electrically connected to the electric motor 6. The electric motor 6 has an inverter 17 connected thereto, and the input connector 16 is connected to the inverter 17. With this, electric power having entered the input connector 16 is supplied to the electric motor 6 via the inverter 17.

The input connector 16 is configured to be selectively connected to the first output connector 14 or one or more of the second output connectors 15. The input connector 16 can be connected to the first output connector 14 or to one or more of the second output connector 15 manually by a worker such as an operator of the working vehicle 1.

In the case where the input connector 16 is connected to the first output connector 14, electric power taken from the on-board battery 8 can be supplied to the electric motor 6. In the case where the input connector 16 is connected to one or more of the second output connectors 15, electric power taken from corresponding one or more of the mobile batteries 9 can be supplied to the electric motor 6. Thus, the input connector 16 need only be connected to the first output connector 14 when the on-board battery 8 is used, whereas the input connector 16 need only be connected to one or more of the second output connectors 15 when corresponding one or more of the mobile batteries 9 are used.

Since the second output connectors 15 are provided to the respective plurality of mobile batteries 9, it is possible to select one or more of the mobile batteries 9 to be used and connect the input connector 16 to the second output connector(s) 15 provided to the selected one or more of the mobile batteries 9. This makes it possible to select and use desired one or more of the plurality of batteries 9.

Note that, although FIG. 2 shows a case where the working vehicle 1 includes a plurality of (four) mobile batteries 9, the working vehicle 1 may include only a single mobile battery 9. When the working vehicle 1 includes only a single mobile battery 9, the working vehicle 1 includes only a single second output connector 15, and therefore a specific, single mobile battery 9 is used.

The switching mechanism 13 includes a third output connector 19 electrically connected to the electric power generator 18. The third output connector 19 is configured to be connected to the input connector 16, to the first output connector 14, and to the second output connectors 15. In the case where the third output connector 19 is connected to the input connector 16, electric power taken from the electric power generator 18 is supplied to the electric motor 6 via the inverter 17. In the case where the third output connector 19 is connected to the first output connector 14, electric power taken from the electric power generator 18 is stored in the on-board battery 8. In the case where the third output connector 19 is connected to one or more of the second output connectors 15, electric power taken from the electric power generator 18 is stored in corresponding one or more of the mobile batteries 9.

Figure 3:
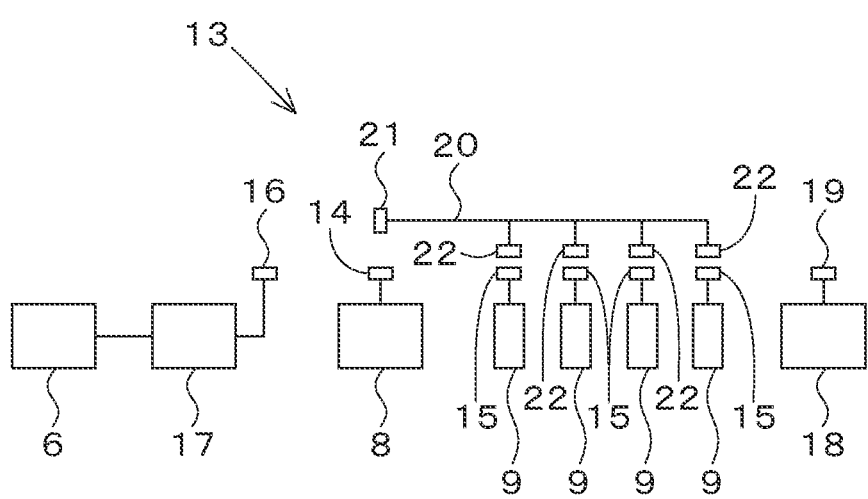
FIG. 3 illustrates a switching mechanism of Second Example.

FIG. 3 illustrates a switching mechanism 13 of Second Example.

The switching mechanism 13 of Second Example includes a first output connector 14, second output connectors 15, an input connector 16, and a junction cable 20.

The first output connector 14 is electrically connected to the on-board battery 8. The second output connectors 15 are electrically connected to a plurality of mobile batteries 9. The second output connectors 15 are provided to the respective plurality of mobile batteries 9.

The input connector 16 is electrically connected to the electric motor 6. The electric motor 6 has an inverter 17 connected thereto, and the input connector 16 is connected to the inverter 17.

The input connector 16 is configured to be selectively connected to the first output connector 14 or one or more of the second output connectors 15. Note that the input connector 16 and the second output connectors 15 are connected to each other indirectly via the junction cable 20 and junction connectors (a first junction connector 21 and second junction connectors 22).

The junction cable 20 is a cable for supply of electric power from the second output connectors 15 to the input connector 16. The junction cable 20 is provided with the first junction connector 21 and the second junction connectors 22. The first junction connector 21 is configured to be connected to the input connector 16. The second junction connectors 22 are configured to be connected to the respective second output connectors 15. The second junction connectors 22 and the second output connectors 15 are in one-to-one relationship with each other.

The input connector 16 is configured to be selectively connected to the first output connector 14 or the first junction connector 21. The input connector 16 is configured to be directly connected to the first output connector 14 and is configured to be connected to the second output connectors 15 via the first junction connector 21 and the junction cable 20. It can therefore be said that the input connector 16 is configured to be selectively connected to the first output connector 14 or one or more of the second output connectors 15. The input connector 16 can be connected to the first output connector 14 or to the first junction connector 21 manually by a worker such as an operator of the working vehicle 1.

In the case where the input connector 16 is connected to the first output connector 14, electric power from the on-board battery 8 can be supplied to the electric motor 6. In the case where the input connector 16 is connected to one or more of the second output connectors 15 via the first junction connector 21 and the junction cable 20, electric power from corresponding one or more of the mobile batteries 9 can be supplied to the electric motor 6.

Since the second output connectors 15 are provided to the respective plurality of mobile batteries 9, it is possible to select one or more of the mobile batteries 9 to be used and connect the second output connector(s) 15 provided to the selected one or more of the mobile batteries 9 to the second junction connector(s) 22 corresponding to the second output connector(s) 15. This makes it possible to supply electric power stored in the selected one or more of the mobile batteries 9 to the electric motor 6.

The switching mechanism 13 includes a third output connector 19 electrically connected to the electric power generator 18. The third output connector 19 is configured to be connected to the input connector 16, to the first output connector 14, and to the first junction connector 21. In the case where the third output connector 19 is connected to the input connector 16, electric power taken from the electric power generator 18 is supplied to the electric motor 6 via the inverter 17. In the case where the third output connector 19 is connected to the first output connector 14, electric power taken from the electric power generator 18 is stored in the on-board battery 8. In the case where the third output connector 19 is connected to the first junction connector 21, electric power taken from the electric power generator 18 is stored in one or more of the mobile batteries 9 via the junction cable 20 and corresponding one or more of the second output connectors 15.

Figure 4:
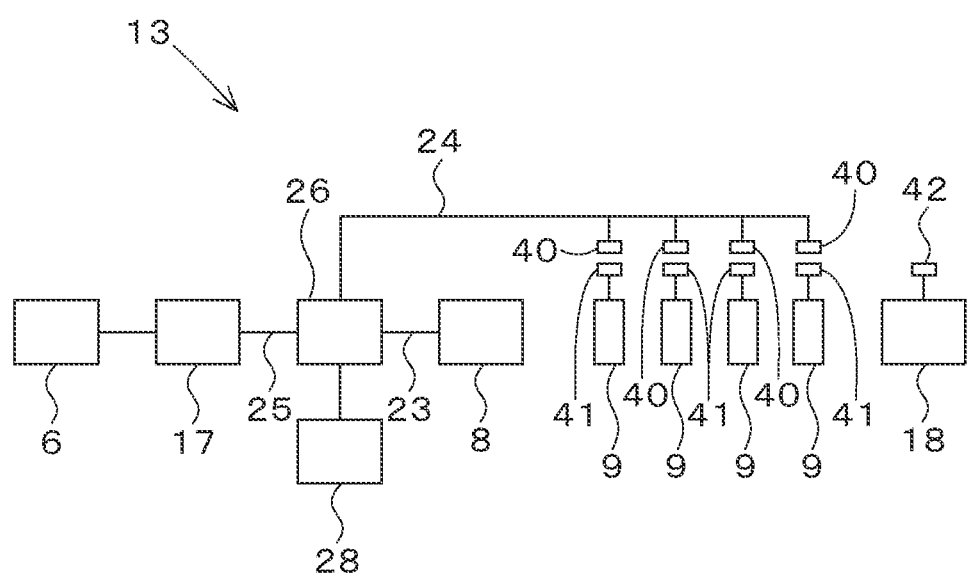
FIG. 4 illustrates a switching mechanism of Third Example.

FIG. 4 illustrates a switching mechanism 13 of Third Example.

The switching mechanism 13 of Third Example includes a first output cable 23, a second output cable 24, a supply cable 25, and a junction box 26.

The first output cable 23 is electrically connected to the on-board battery 8. The second output cable 24 is configured to be electrically connected to one or more mobile batteries 9. The supply cable 25 is electrically connected to the electric motor 6. The junction box 26 houses therein electric circuit(s) and/or electric wire(s) at least including a relay.

The first output cable 23 connects the junction box 26 and the on-board battery 8. The second output cable 24 connects the junction box 26 and the one or more mobile batteries 9. The second output cable 24 is provided with one or more connectors 40. The one or more connectors 40 are configured to be connected to one or more connectors 41 provided to the one or more mobile batteries 9.

The second output cable 24 in the example in FIG. 4 is provided with a plurality of connectors 40, and there are a plurality of mobile batteries 9. The plurality of mobile batteries 9 are provided with respective connectors 41. The plurality of connectors 40 are configured to be connected to the respective plurality of connectors 41. The plurality of connectors 40 and the plurality of connectors 41 are in one-to-one relationship with each other. Connecting the plurality of connectors 40 and the plurality of connectors 41 makes it possible to allow electric power to be taken from the plurality of mobile batteries 9 into the second output cable 24.

The electric motor 6 has an inverter 17 connected thereto, and one end of the supply cable 25 is connected to the inverter 17. With this, electric power having entered the supply cable 25 is supplied to the electric motor 6 via the inverter 17. The opposite end of the supply cable 25 is connected to the junction box 26.

Figure 5:
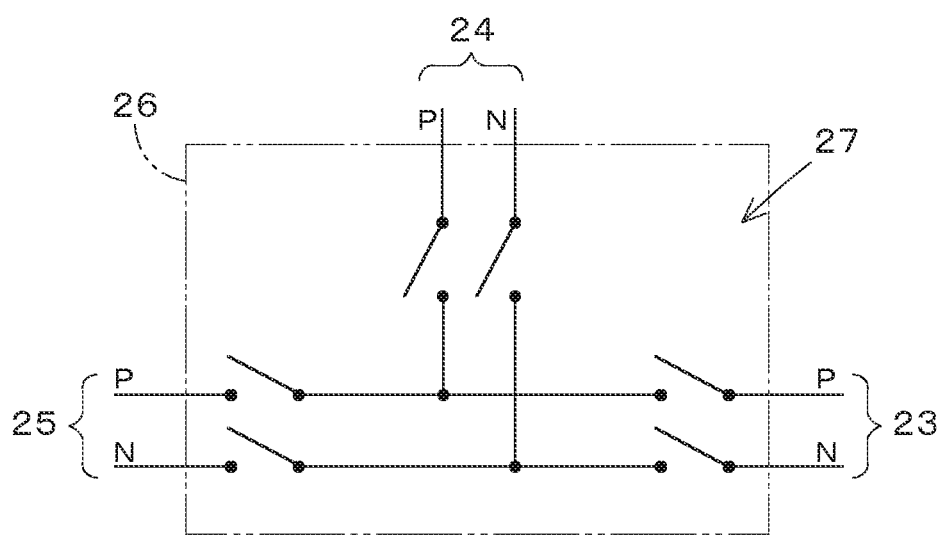
FIG. 5 illustrates a relay housed in a junction box of the switching mechanism of Third Example.

FIG. 5 illustrates a relay 27 housed in the junction box 26.

Figure 6A:
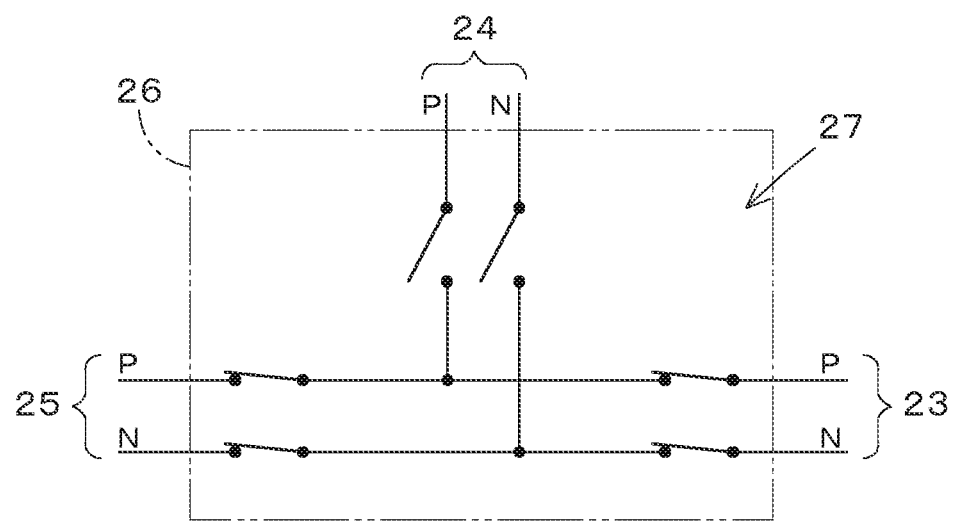
FIG. 6A shows a first connection state of the relay in FIG. 5 in which a first output cable and a supply cable are electrically connected to each other.
Figure 6B:
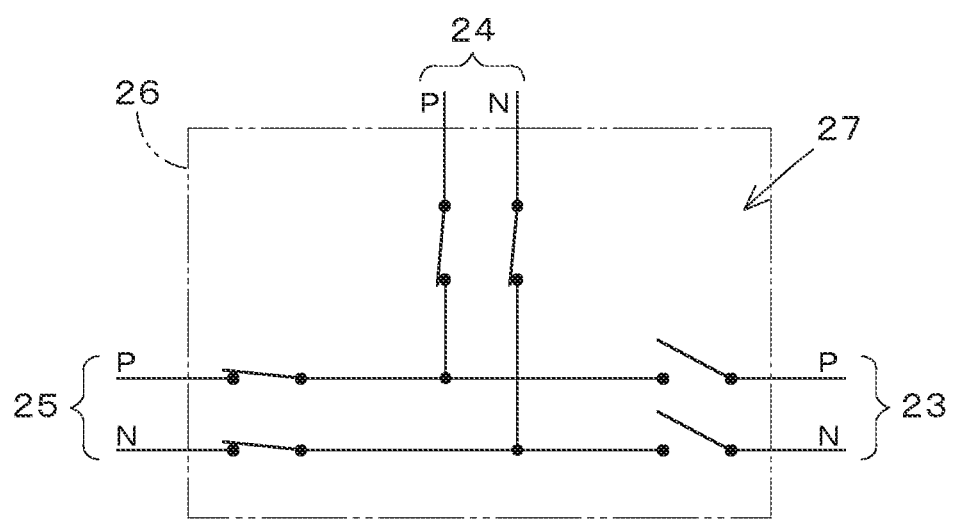
FIG. 6B shows a second connection state of the relay in FIG. 5 in which a second output cable and the supply cable are electrically connected to each other.

The relay 27 is configured to be selectively placed in a first connection state in which the relay 27 electrically connects the first output cable 23 and the supply cable 25 to each other (see FIG. 6A) or a second connection state in which the relay 27 electrically connects the second output cable 24 and the supply cable 25 to each other (see FIG. 6B).

When the relay 27 is in the first connection state, the first output cable 23 and the supply cable 25 are electrically connected to each other, and therefore electric power stored in the on-board battery 8 is taken through the first output cable 23 and is supplied to the electric motor 6 via the supply cable 25. When the relay 27 is in the second connection state, the second output cable 24 and the supply cable 25 are electrically connected to each other, and therefore electric power stored in one or more of the mobile batteries 9 is taken through the second output cable 24 and is supplied to the electric motor 6 via the supply cable 25.

As illustrated in FIG. 4, the switching mechanism 13 includes a controller 28 to control operation of the relay 27. The controller 28 includes a CPU, an electric/electronic circuit, a storage, a memory, and/or the like. Examples of the storage and the memory include a RAM, a ROM, and the like. The storage/memory stores therein predetermined control program(s), and the CPU controls the operation of the relay 27 on the basis of the control program(s).

The controller 28 places the relay 27 in the second connection state when the battery power remaining in the mobile batteries 9 is equal to or greater than a predetermined level, and places the relay 27 in the first connection state when the battery power remaining in the mobile batteries 9 is less than the predetermined level.

The battery power remaining in the mobile batteries 9 (the amount of remaining electric power stored in the mobile batteries 9) is detected by a battery level detector (not illustrated) provided to the mobile batteries 9, and numerical data indicative of the detected remaining battery power is sent to the controller 28. The controller 28 determines whether the battery power remaining in the mobile batteries 9 is equal to or greater than the predetermined level or less than the predetermined level on the basis of the numerical data indicative of the remaining battery power.

The switching mechanism 13 includes a connector 42 electrically connected to the electric power generator 18. The connector 42 is configured to be connected to the connectors 40 on the second output cable 24. When the connector 42 is connected to one or more of the connectors 40, electric power taken from the electric power generator 18 is supplied to the electric motor 6 via the junction box 26 and the inverter 17.

Figure 7:
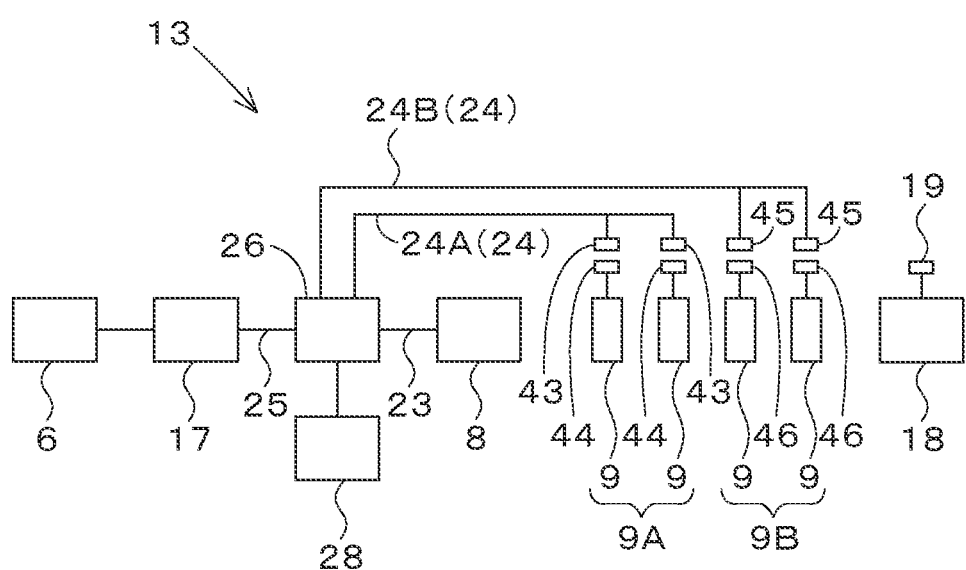
FIG. 7 illustrates a switching mechanism of Fourth Example.

FIG. 7 illustrates a switching mechanism 13 of Fourth Example.

The switching mechanism 13 of Fourth Example includes a first output cable 23, second output cables 24, a supply cable 25, and a junction box 26.

The first output cable 23 is electrically connected to the on-board battery 8. The second output cables 24 are electrically connected to mobile batteries 9. The supply cable 25 is electrically connected to the electric motor 6. The junction box 26 houses therein electric circuit(s) and/or electric wire(s) at least including a relay.

The first output cable 23 connects the junction box 26 and the on-board battery 8. The second output cables 24 connect the junction box 26 and the mobile batteries 9.

The mobile batteries 9 include one or more first mobile batteries 9A and one or more second mobile batteries 9B. The one or more first mobile batteries 9A are one or more of the mobile batteries 9. In FIG. 7, the number of the first mobile batteries 9A is two. The one or more of the second mobile battery 9B are another one or more of the mobile batteries 9. In FIG. 7, the number of the second mobile batteries 9B is two. The number of the first mobile batteries 9A and the number of the second mobile batteries 9B may be the same or different. The total capacity of the one or more first mobile batteries 9A and the total capacity of the one or more second mobile batteries 9B may be the same or different.

The second output cables 24 include a first cable 24A configured to be electrically connected to the one or more first mobile batteries 9A and a second cable 24B configured to be electrically connected to the one or more second mobile batteries 9B. The first cable 24A is provided with one or more connectors 43. The one or more connectors 43 are configured to be connected to one or more connectors 44 provided to the one or more first mobile batteries 9A. The second cable 24B is provided with one or more connectors 45. The one or more connectors 45 are configured to be connected to one or more connectors 46 provided to the one or more second mobile batteries 9B.

The one or more connectors 43 are configured to be connected to the respective one or more connectors 44. The one or more connectors 43 and the one or more connectors 44 are in one-to-one relationship with each other. Connecting the one or more connectors 43 and the one or more connectors 44 makes it possible to allow electric power to be taken from the one or more first mobile batteries 9A into the first cable 24A.

The one or more connectors 45 are configured to be connected to the respective one or more connectors 46. The one or more connectors 45 and the one or more connectors 46 are in one-to-one relationship with each other. Connecting the one or more connectors 45 and the one or more connectors 46 makes it possible to allow electric power to be taken from the one or more second mobile batteries 9B into the second cable 24B.

The electric motor 6 has an inverter 17 connected thereto, and one end of the supply cable 25 is connected to the inverter 17. With this, electric power having entered the supply cable 25 is supplied to the electric motor 6 via the inverter 17. The opposite end of the supply cable 25 is connected to the junction box 26.

Figure 8:
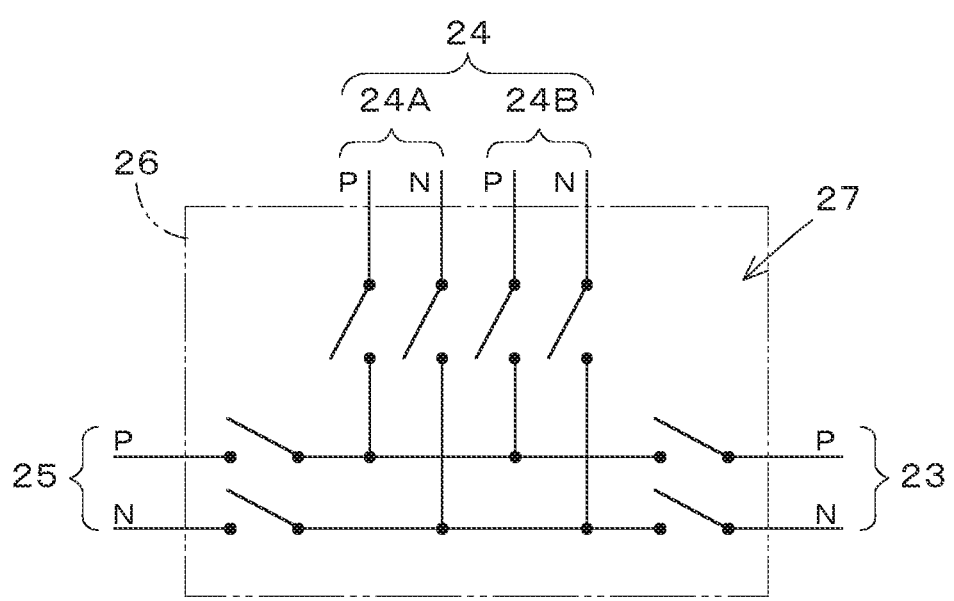
FIG. 8 illustrates a relay housed in a junction box of the switching mechanism of Fourth Example.

FIG. 8 illustrates a relay 27 housed in the junction box 26.

Figure 9A:
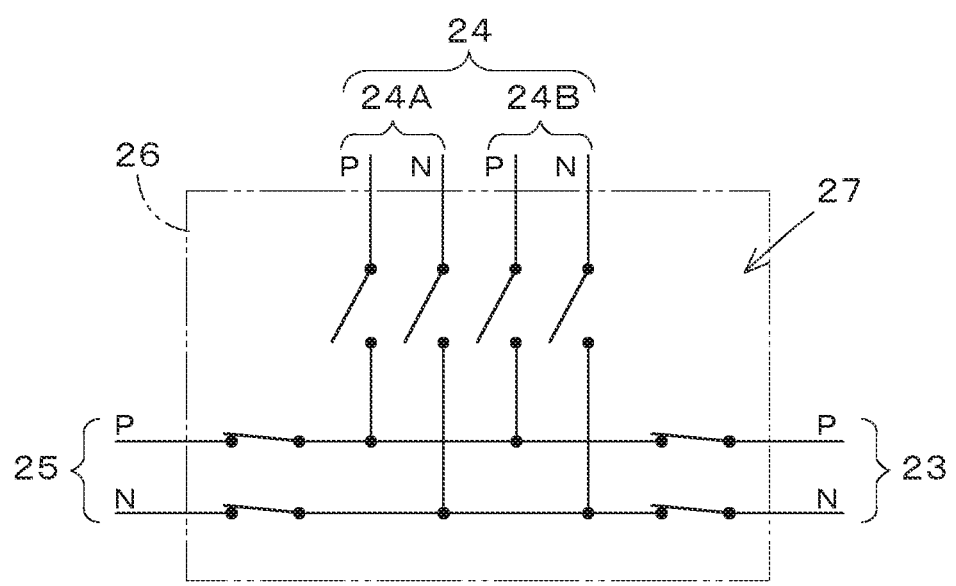
FIG. 9A shows a first connection state of the relay in FIG. 8 in which a first output cable and a supply cable are electrically connected to each other.
Figure 9B:
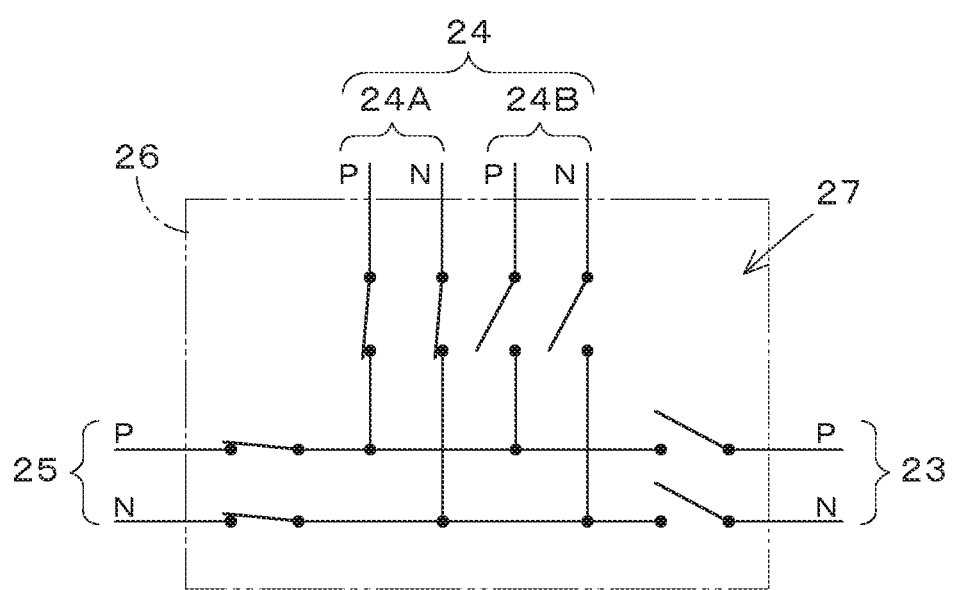
FIG. 9B shows a first form of a second connection state of the relay in FIG. 8 in which a first cable (which is one of second output cables) and a supply cable are electrically connected to each other.
Figure 9C:
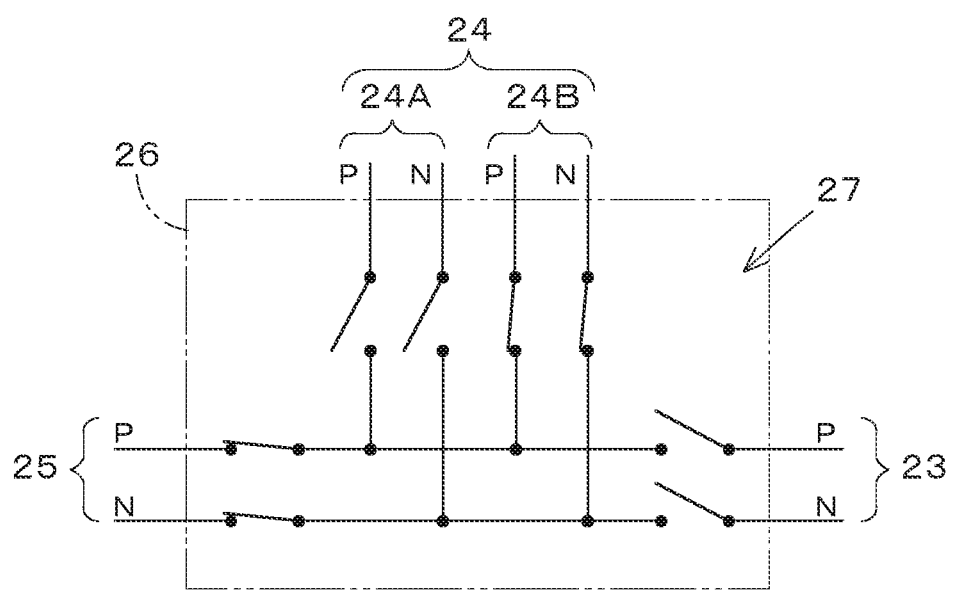
FIG. 9C shows a second form of the second connection state of the relay in FIG. 8 in which a second cable (which is the other of the second output cables) and the supply cable are electrically connected to each other.

The relay 27 is configured to be selectively placed in a first connection state in which the relay 27 electrically connects the first output cable 23 and the supply cable 25 to each other (see FIG. 9A) or a second connection state in which the relay 27 electrically connects one of the second output cables 24 and the supply cable 25 to each other (see FIGS. 9B and 9C).

When the relay 27 is in the first connection state, the first output cable 23 and the supply cable 25 are electrically connected to each other, and therefore electric power stored in the on-board battery 8 is taken through the first output cable 23 and is supplied to the electric motor 6 via the supply cable 25. When the relay 27 is in the second connection state, one of the second output cables 24 and the supply cable 25 are electrically connected to each other, and therefore electric power stored in one or more of the mobile batteries 9 is taken through the one of the second output cables 24 and is supplied to the electric motor 6 via the supply cable 25.

The relay 27 is configured to be selectively placed in a first form of the second connection state in which the relay 27 electrically connects the first cable 24A and the supply cable 25 to each other (see FIG. 9B) or a second form of the second connection state in which the relay 27 electrically connects the second cable 24B and the supply cable 25 are electrically connected to each other (FIG. 9C).

When the relay 27 is in the first form of the second connection state, the first cable 24A and the supply cable 25 are electrically connected to each other, and therefore electric power stored in the one or more first mobile batteries 9A is taken through the first cable 24A and is supplied to the electric motor 6 via the supply cable 25. When the relay 27 is in the second form of the second connection state, the second cable 24B and the supply cable 25 are electrically connected to each other, and therefore electric power stored in the one or more second mobile batteries 9B is taken through the second cable 24B and is supplied to the electric motor 6 via the supply cable 25.

Switching between the first and second forms of the second connection state may be achieved by an operator's operation of an operable switch on the working vehicle 1 or a configuration in which the switching is achieved automatically by the controller 28 may be used. For example, the controller 28 places the relay 27 in the first form of the second connection state when the battery power remaining in the one or more first mobile batteries 9A is equal to or greater than a predetermined level, places the relay 27 in the second form of the second connection state when the battery power remaining in the one or more first mobile batteries 9A is less than the predetermine level, and places the relay 27 in the first connection state when the battery power remaining in the one or more second mobile batteries 9B is less than a predetermined level.

The relay 27 may be placed in another form (third form, not illustrated) of the second connection state in in which the relay 27 electrically connects the first cable 24A and the supply cable 25 to each other and electrically connects the second cable 24B and the supply cable 25 to each other. That is, the relay 27 may be selectively placed in the first, second, or third form of the second connection state. When the relay 27 is in the third form of the second connection state, electric power stored in the one or more first mobile batteries 9A is taken through the first cable 24A and is supplied to the electric motor 6 via the supply cable 25, and electric power stored in the one or more second mobile batteries 9B is taken through the second cable 24B and is supplied to the electric motor 6 via the supply cable 25.

Switching between the first, second, and third forms of the second connection state may be achieved by an operator's operation of an operable switch on the working vehicle 1 or a configuration in which the switching is achieved automatically by control of the operation of the relay 27 by the controller 28 may be used.

Note that, in FIGS. 5, 6, and 8 to 9C, each letter "N" indicates a negative wire, and each letter "P" indicates a positive wire. Each of the relays 27 illustrated in FIGS. 5, 6, and 8 to 9C may be a relay only for positive wires.

It is preferable that the working vehicle 1 include a plurality of the mounts 10 for attachment of the mobile batteries 9. The mounts 10 are preferably disposed at at least one of the following positions: a position in front of the vehicle body 2, a position behind the vehicle body 2, a position inside a hood 29 of the vehicle body 2, a position below the seat 4 on the vehicle body 2, a roof 31 above the seat 4, an upper portion of the cargo bed 5 on the vehicle body 2, and a position below the cargo bed 5. The mounts 10 may be disposed at positions other than those listed above.

Figure 10:
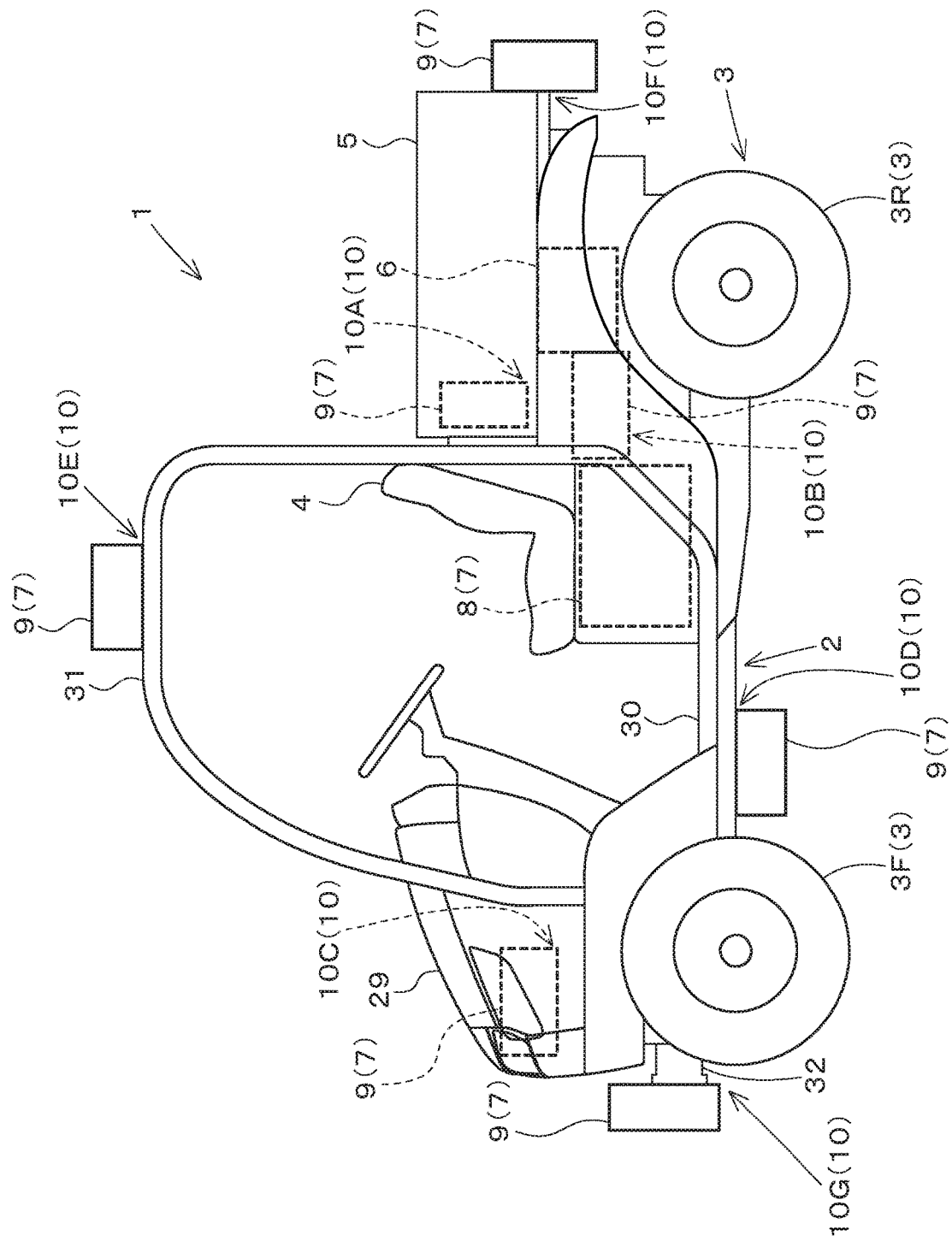
FIG. 10 illustrates a utility vehicle as an example of a working vehicle including a plurality of mounts.

FIG. 10 illustrates an example of a working vehicle 1 which includes a plurality of mounts 10.

The working vehicle 1 illustrated in FIG. 10 is a utility vehicle, and includes an on-board battery 8 provided below a seat 4. The working vehicle (utility vehicle) 1 includes seven mounts 10. The seven mounts 10 are hereinafter referred to as a first mount 10A, a second mount 10B, a third mount 10C, a fourth mount 10D, a fifth mount 10E, a sixth mount 10F, and a seventh mount 10G. Note, however, that the working vehicle (utility vehicle) 1 does not need to include all the seven mounts 10, and need only include at least one mount 10 (preferably two or more mounts 10).

The first mount 10A is disposed on an upper portion of the cargo bed 5. The second mount 10B is disposed below the cargo bed 5. The third mount 10C is disposed on a front portion of the vehicle body 2 (inside the hood 29). The fourth mount 10D is disposed on a lower portion of the vehicle body 2 (below a step 30 in front of the seat 4). The fifth mount 10E is disposed on the roof 31 above the seat 4. The sixth mount 10F is disposed behind the vehicle body 2 (behind the cargo bed 5). The seventh mount 10G is disposed in front of the vehicle body 2 (in front of the hood 29 [on a front portion of a vehicle body frame 32]). One or more of the mounts 10 may be disposed below the seat 4 (not illustrated).

One or more mobile batteries 9 are detachably attached to one or more of the first to seventh mounts 10A to 10G. In the case where a plurality of mobile batteries 9 are attached, it is preferable that the mobile battery 9 attached to the first mount 10A be used as top-priority. It is also preferable that the priority be the mobile battery 9 attached to the first mount 10A, then the mobile battery 9 attached to the second mount 10B, then the mobile battery 9 attached to the third mount 10C, then the mobile battery 9 attached to the fourth mount 10D, then the mobile battery 9 attached to the fifth mount 10E, then the mobile battery 9 attached to the sixth mount 10F, and then the mobile battery 9 attached to the seventh mount 10G. This is because it is possible to attach and detach a mobile battery 9 more easily to/from the first mount 10A than to/from the second mount 10B, more easily to/from the second mount 10B than to/from the third mount 10C, more easily to/from the third mount 10C than to/from the fourth mount 10D, more easily to/from the fourth mount 10D than to/from the fifth mount 10E, more easily to/from the fifth mount 10E than to/from the sixth mount 10F, and more easily to/from the sixth mount 10F than to/from the seventh mount 10G.

In the case where the working vehicle 1 includes the foregoing switching mechanism 13 of Fourth Example, it is preferable that one or more first mobile batteries 9A be attached to the first mount 10A (upper portion of the cargo bed 5) and one or more second mobile batteries 9B be attached to one or more mounts other than the first mount 10A. In such a case, the relay 27 operates such that the relay 27 is in the first form of the second connection state (see FIG. 9B) when the battery power remaining in the one or more first mobile battery 9A is equal to or greater than a predetermined level, and in the second form of the second connection state (see FIG. 9C) when the battery power remaining in the one or more first mobile battery 9A is less than the predetermined level. Such operation of the relay 27 is achieved by control of the operation of the relay 27 by the controller 28. This makes it possible to use the mobile battery(batteries) 9 attached to the first mount 10A (upper portion of the cargo bed 5) in priority to the mobile battery (batteries) 9 attached to the other mount(s).

Figure 11:
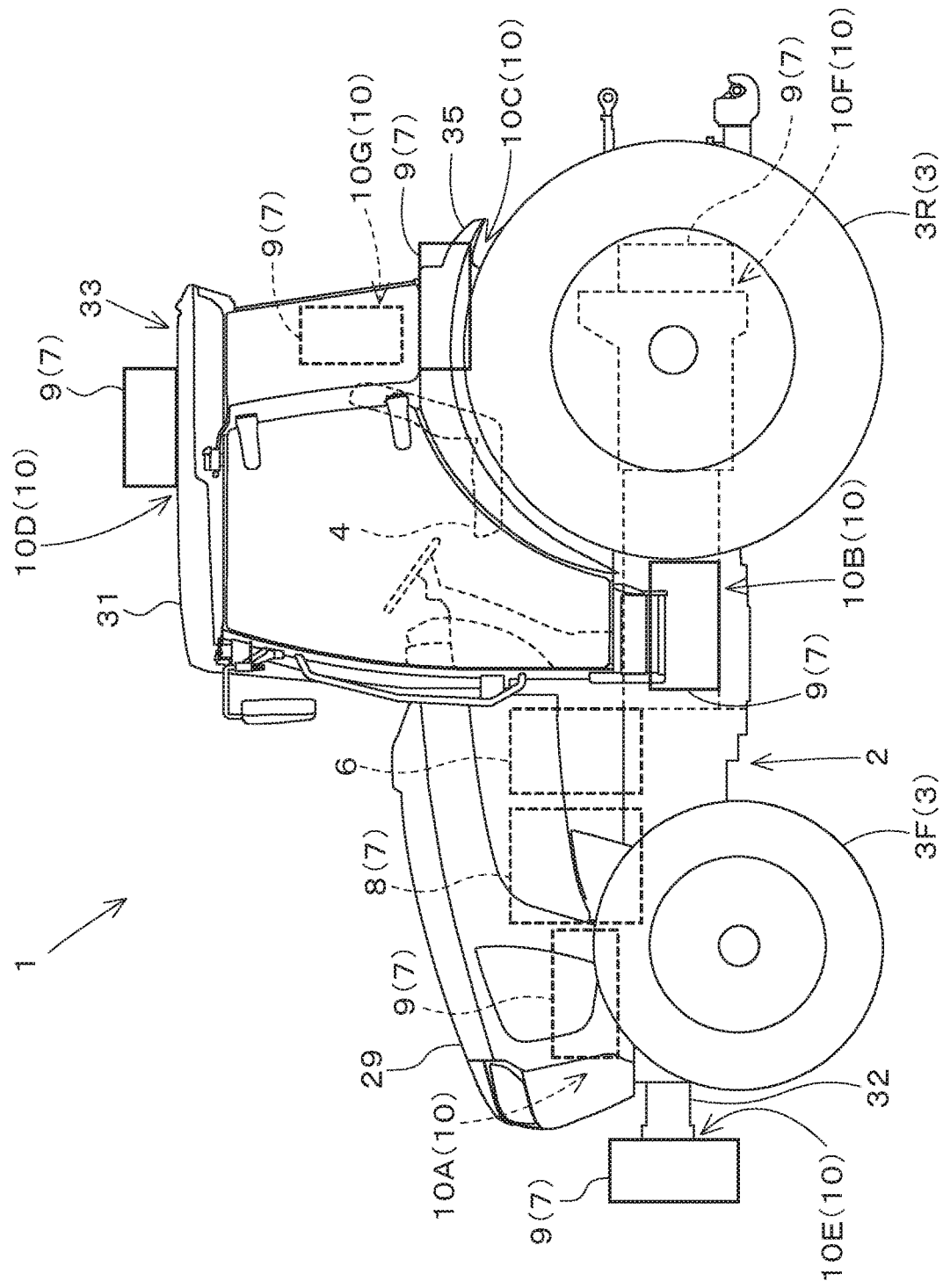
FIG. 11 is a side view of a tractor as an example of a working vehicle including a plurality of mounts.

FIG. 11 illustrates another example of the working vehicle 1 which includes a plurality of mounts 10.

The working vehicle 1 illustrated in FIG. 11 is a tractor, and includes an on-board battery 8 inside a hood 29. An electric motor 6 is also provided inside the hood 29. The working vehicle (tractor) 1 includes seven mounts 10. The seven mounts 10 are hereinafter referred to as a first mount 10A, a second mount 10B, a third mount 10C, a fourth mount 10D, a fifth mount 10E, a sixth mount 10F, and a seventh mount 10G. Note, however, that the working vehicle (tractor) 1 does not need to include all the seven mounts 10, and need only include at least one mount 10 (preferably two or more mounts 10).

The first mount 10A is disposed inside the hood 29. The second mount 10B is disposed on a lower portion of the vehicle body 2 (between the front wheels 3F and the rear wheels 3R). The third mount 10C is disposed on a rear portion of the vehicle body 2 (on a fender 36 which covers above a rear wheel 3R). The fourth mount 10D is disposed on a roof 31 of a cabin 33. The fifth mount 10E is disposed in front of the vehicle body 2 (in front of the hood 29 [on a front portion of a vehicle body frame 32]). The sixth mount 10F is disposed behind the vehicle body 2. The seventh mount 10G is disposed within the cabin 33. One or more mounts 10 may be disposed below the seat 4 (such one or more mounts 10 are not illustrated).

One or more mobile batteries 9 are detachably attached to one or more of the first to seventh mounts 10A to 10G. In the case where a plurality of mobile batteries 9 are attached, it is preferable that the mobile battery 9 attached to the first mount 10A be used as top-priority. It is also preferable that the priority be the mobile battery 9 attached to the first mount 10A, then the mobile battery 9 attached to the second mount 10B, then the mobile battery 9 attached to the third mount 10C, then the mobile battery 9 attached to the fourth mount 10D, then the mobile battery 9 attached to the fifth mount 10E, then the mobile battery 9 attached to the sixth mount 10F, and then the mobile battery 9 attached to the seventh mount 10G. This is because it is possible to attach and detach a mobile battery 9 more easily to/from the first mount 10A than to/from the second mount 10B, more easily to/from the second mount 10B than to/from the third mount 10C, more easily to/from the third mount 10C than to/from the fourth mount 10D, more easily to/from the fourth mount 10D than to/from the fifth mount 10E, more easily to/from the fifth mount 10E than to/from the sixth mount 10F, and more easily to/from the sixth mount 10F than to/from the seventh mount 10G.

In the case where the working vehicle 1 includes the foregoing switching mechanism 13 of Fourth Example, it is preferable that one or more first mobile batteries 9A be attached to the first mount 10A (inside the hood 29) and one or more second mobile battery 9B be attached to one or more mounts other than the first mount 10A. In such a case, the relay 27 operates such that the relay 27 is in the first form of the second connection state (see FIG. 9B) when the battery power remaining in the one or more first mobile batteries 9A is equal to or greater than a predetermined level, and in the second form of the second connection state (see FIG. 9C) when the battery power remaining in the one or more first mobile batteries 9A is less than the predetermined level. Such operation of the relay 27 is achieved by control the operation of the relay 27 by the controller 28. This makes it possible to use the mobile battery(batteries) 9 attached to the first mount 10A (inside the hood 29) in priority to the mobile battery(batteries) 9 attached to the other mount(s).

Figure 12:
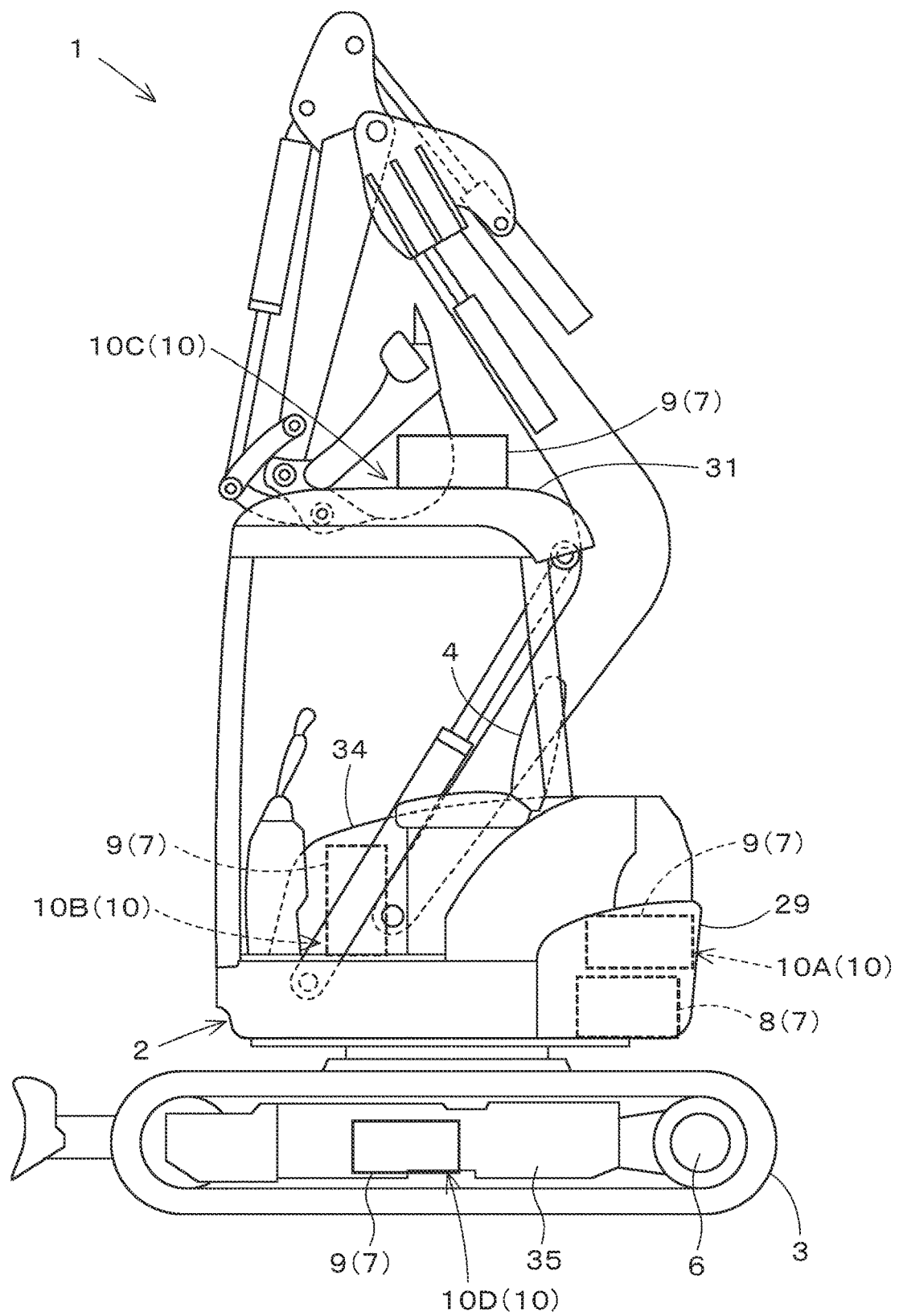
FIG. 12 is a side view of a backhoe as an example of a working vehicle including a plurality of mounts.

FIG. 12 illustrates a further example of the working vehicle 1 which includes a plurality of mounts 10.

The working vehicle 1 illustrated in FIG. 12 is a backhoe, and includes an on-board battery 8 inside a hood 29. The working vehicle (backhoe) 1 includes four mounts 10. The four mounts 10 are hereinafter referred to as a first mount 10A, a second mount 10B, a third mount 10C, and a fourth mount 10D. Note, however, that the working vehicle (backhoe) 1 does not need to include all the four mounts 10, and need only include at least one mount 10 (preferably two or more mounts 10).

The first mount 10A is disposed inside a hood 29 (rear portion of a vehicle body 2). The second mount 10B is disposed inside a side cover 34 provided lateral to a seat 4. The third mount 10C is disposed on a roof 31 above the seat 4. The fourth mount 10D is disposed on a frame 35 of a traveling device (crawler) 3. One or more mounts 10 may be disposed below the seat 4 (such one or more mounts 10 are not illustrated).

One or more mobile batteries 9 are detachably attached to one or more of the first to seventh mounts 10A to 10D. In the case where a plurality of mobile batteries 9 are attached, it is preferable that the mobile battery 9 attached to the first mount 10A be used as top-priority. It is also preferable that the priority be the mobile battery 9 attached to the first mount 10A, then the mobile battery 9 attached to the second mount 10B, then the mobile battery 9 attached to the third mount 10C, and then the mobile battery 9 attached to the fourth mount 10D. This is because it is possible to attach and detach a mobile battery 9 more easily to/from the first mount 10A than to/from the second mount 10B, more easily to/from the second mount 10B than to/from the third mount 10C, and more easily to/from the third mount 10C than to/from the fourth mount 10D.

In the case where the working vehicle 1 includes the foregoing switching mechanism 13 of Fourth Example, it is preferable that one or more first mobile batteries 9A be attached to the first mount 10A (inside the hood 29) and one or more second mobile batteries 9B be attached to one or more mounts other than the first mount 10A. In such a case, the relay 27 operates such that the relay 27 is in the first form of the second connection state (see FIG. 9B) when the battery power remaining in the one or more first mobile batteries 9A is equal to or greater than a predetermined level, and in the second form of the second connection state (see FIG. 9C) when the battery power remaining in the one or more first mobile batteries 9A is less than the predetermined level. Such operation of the relay 27 is achieved by control of the operation of the relay 27 by the controller 28. This makes it possible to use the mobile battery(batteries) 9 attached to the first mount 10A (inside the hood 29) in priority to the mobile battery(batteries) 9 attached to the other mount(s).

In the case where the working vehicle 1 includes a plurality of mobile batteries 9, the working vehicle 1 can be configured such that one or more mobile batteries 9 attached closer to the on-board battery 8 are used in priority to the other one or more mobile batteries 9. In such a case, the on-board battery 8 and one or more prioritized mobile batteries 9 can be accessed from the same position or from positions close to each other. This makes it easy to access the one or more prioritized mobile batteries 9.

The working vehicle (utility vehicle) 1 illustrated in FIG. 10 is such that the mobile battery 9 attached to the first mount 10A and the mobile battery 9 attached to the second mount 10B are closer to the on-board battery 8 than the mobile batteries 9 attached to the other mounts are to the on-board battery 8.

In such a case, the relay 27 operates such that the relay 27 is in the first form of the second connection state (see FIG. 9B) when the battery power remaining in first mobile batteries (the mobile battery 9 attached to the first mount 10A and the mobile battery 9 attached to the second mount 10B) is equal to or greater than a predetermined level, and in the second form of the second connection state (see FIG. 9C) when the battery power remaining in the first mobile batteries is less than the predetermined level. Such operation of the relay 27 is achieved by control of the operation of the relay 27 by the controller 28. This makes it possible to use the mobile batteries 9 attached close to the on-board battery 8 (attached to the first mount 10A and the second mount 10B) in priority to the mobile batteries 9 attached to the other mounts.

The working vehicle (tractor) 1 illustrated in FIG. 11 and the working vehicle (backhoe) 1 illustrated in FIG. 12 are such that the mobile battery 9 attached to the first mount 10A is closer to the on-board battery 8 than the mobile batteries 9 attached to the other mounts are to the on-board battery 8.

In such a case, the relay 27 operates such that the relay 27 is in the first form of the second connection state (see FIG. 9B) when the battery power remaining in a first mobile battery (the mobile battery 9 attached to the first mount 10A) is equal to or greater than a predetermined level, and in the second form of the second connection state (see FIG. 9C) when the battery power remaining in the first mobile battery is less than the predetermined level. Such operation of the relay 27 is achieved by control of the operation of the relay 27 by the controller 28. This makes it possible to use the mobile battery 9 attached close to the on-board battery 8 (attached to the first mount 10A) in priority to the mobile batteries 9 attached to the other mounts.

In the present invention, it is preferable that the controller 28 do not switch the relay 27 between the first connection state and the second connection state while the traveling device 3 is driven. This makes it possible to prevent the working vehicle 1, while traveling, from stopping due to the switching between the first connection state and the second connection state.

The foregoing configurations of the working vehicle 1 achieve the following effects.

A working vehicle 1 includes a vehicle body 2, a traveling device 3 which supports the vehicle body 2 such that the vehicle body 2 is allowed to travel, an electric motor 6 to drive the traveling device 3, the electric motor 6 being provided on the vehicle body 2, and a plurality of batteries 7 to store electric power to be supplied to the electric motor 6, wherein the plurality of batteries 7 include an on-board battery 8 fixed to the vehicle body 2 and a mobile battery 9 detachably attached to the vehicle body 2.

The configuration makes it possible to adjust the balance between achieving battery capacity and reducing the cost for the vehicle body according to a user's needs and/or the like by adjusting the capacity of one or more mobile batteries 9 (e.g., adjusting the number of mobile batteries 9) attached to the vehicle body 2. Specifically, when high battery capacity is considered important, the high battery capacity can be achieved by increasing the capacity of one or more mobile batteries 9 (e.g., increasing the number of mobile batteries 9). On the contrary, when a reduction in cost for the vehicle body is considered important, such a reduction in cost for the vehicle body can be achieved by reducing the capacity of one or more mobile batteries 9 (e.g., reducing the number of mobile batteries 9).

The working vehicle 1 may further include a switching mechanism 13. The switching mechanism 13 may be configured to be selectively placed in a first state in which electric power is supplied from the on-board battery 8 to the electric motor 6 or a second state in which electric power is supplied from the mobile battery 9 to the electric motor 6.

The configuration makes it possible to easily switch between using the on-board battery 8 and using the mobile battery 9 with the switching mechanism 13.

The switching mechanism 13 may include a first output connector 14 electrically connected to the on-board battery 8. The switching mechanism 13 may include a second output connector 15 electrically connected to the mobile battery 9. The switching mechanism 13 may include an input connector 16 electrically connected to the electric motor 6. The input connector 16 may be configured to be selectively connected to the first output connector 14 or the second output connector 15.

With the configuration, connecting the input connector 16 and the first output connector 14 makes it possible to allow electric power to be taken from the on-board battery 8 and supplied to the electric motor 6. Connecting the input connector 16 and the second output connector 15 makes it possible to allow electric power to be taken from the mobile battery 9 and supplied to the electric motor 6. This makes it possible to easily switch between using the on-board battery 8 and using the mobile battery 9 by performing the simple operation of disconnecting and reconnecting a connector.

The switching mechanism 13 may include a junction cable 20 for supply of electric power from the second output connector 15 to the input connector 16. A plurality of the mobile batteries 9 may be detachably attached to the vehicle body 2. The plurality of mobile batteries 9 may be provided with a respective plurality of the second output connectors 15. The junction cable 20 may be provided with a first junction connector 21 and a plurality of second junction connectors 22, the first junction connector 21 being configured to be connected to the input connector 16, the plurality of second junction connectors 22 being configured to be connected to the respective plurality of second output connectors 15.

With the configuration, it is possible to allow electric power to be taken from desired one or more of the plurality of mobile batteries 9 and routed to the input connector 16 via the junction cable 20 by connecting corresponding one or more of the plurality of second output connectors 15 to corresponding one or more of the second junction connectors 22 and connecting the input connector 16 and the first junction connector 21. This makes it possible to select and use desired one or more of the plurality of mobile batteries 9.

The switching mechanism 13 may include a first output cable 23 electrically connected to the on-board battery 8. The switching mechanism 13 may include a second output cable 24 configured to be electrically connected to the mobile battery 9. The switching mechanism 13 may include a supply cable 25 electrically connected to the electric motor 6. The switching mechanism 13 may include a relay 27 configured to be selectively placed in a first connection state in which the relay 27 electrically connects the first output cable 23 and the supply cable 25 to each other or a second connection state in which the relay 27 electrically connects the second output cable 24 and the supply cable 25 to each other.

With the configuration, switching between the first connection state and the second connection state of the relay 27 makes it possible to switch between a state in which electric power is taken from the on-board battery 8 and supplied to the electric motor 6 and a state in which electric power is taken from the mobile battery 9 and supplied to the electric motor 6. This makes it possible to automatically switch between using the on-board battery 8 and using the mobile battery 9 without having to manually connect or disconnect a connector.

A plurality of the mobile batteries 9 may be detachably attached to the vehicle body 2. The second output cable 24 may be configured to be electrically connected to the plurality of mobile batteries 9.

The configuration makes it possible to automatically switch between using the on-board battery 8 and using the plurality of mobile batteries 9 without having to manually connect or disconnect a connector.

A plurality of the mobile batteries 9 may be detachably attached to the vehicle body 2. The plurality of mobile batteries 9 may include a first mobile battery 9A and a second mobile battery 9B. The switching mechanism 13 may include a plurality of the second output cables 24 including a first cable 24A configured to be electrically connected to the first mobile battery 9A and a second cable 24B configured to be electrically connected to the second mobile battery 9B. The relay 27 may be configured to be selectively placed in a first form of the second connection state in which the relay 27 electrically connects the first cable 24A and the supply cable 25 to each other or a second form of the second connection state in which the relay 27 electrically connects the second cable 24B and the supply cable 25 to each other.

With the configuration, switching between the first form and the second form of the second connection state of the relay 27 makes it possible to switch between a state in which electric power is taken from the first mobile battery 9A and supplied to the electric motor 6 and a state in which electric power is taken from the second mobile battery 9B and supplied to the electric motor 6. This makes it possible, in the working vehicle 1 including a plurality of mobile batteries 9, to automatically switch between using the first mobile battery 9A and using the second mobile battery 9B.

The working vehicle 1 may further include one or more mounts 10 to have one or more of the mobile batteries 9 detachably attached thereto. The one or more mounts 10 may be disposed at at least one of: a position in front of the vehicle body 2; a position behind the vehicle body 2; a position inside a hood 29 on the vehicle body 2; a position below a seat 4 on the vehicle body 2; a roof 31 above the seat 4; an upper portion of a cargo bed 5 on the vehicle body 2; and a position below the cargo bed 5.

The configuration makes it possible to detachably attach one or more mobile batteries 9 at at least one appropriate position of the working vehicle 1. This makes it possible to easily attach and detach one or more mobile batteries 9 to and from the vehicle body 2.

The first mobile battery 9A may be detachably attached to an upper portion of a cargo bed 5 on the vehicle body 2. The second mobile battery 9B may be detachably attached to a position other than the upper portion of the cargo bed 5. The relay 27 may be placed in the first form of the second connection state when battery power remaining in the first mobile battery 9A is equal to or greater than a predetermined level. The relay 27 may be placed in the second form of the second connection state when the battery power remaining in the first mobile battery 9A is less than the predetermined level.

The configuration makes it possible, in the working vehicle 1 including the cargo bed 5 (such as a utility vehicle), to allow the mobile battery 9 attached to an upper portion of the cargo bed 5, which can be easily attached and detached, to be used in priority to the mobile battery (batteries) 9 attached to the other position(s).

The first mobile battery 9A may be detachably attached to a position inside a hood 29 on the vehicle body 2. The second mobile battery 9B may be detachably attached to a position not inside the hood 29. The relay 27 may be placed in the first form of the second connection state when battery power remaining in the first mobile battery 9A is equal to or greater than a predetermined level. The relay 27 may be placed in the second form of the second connection state when the battery power remaining in the first mobile battery 9A is less than the predetermined level.

The configuration makes it possible, in the working vehicle 1 including the hood 29 (such as a tractor or a backhoe), to allow the mobile battery 9 attached inside the hood 29 to be used in priority to the mobile battery(batteries) 9 attached to the other position(s). Since the hood 29 can be opened and closed, it is possible to easily attach and detach the prioritized mobile battery 9.

The first mobile battery 9A may be detachably attached closer to the on-board battery 8 than the second mobile battery 9B is to the on-board battery 8. The relay 27 may be placed in the first form of the second connection state when battery power remaining in the first mobile battery 9A is equal to or greater than a predetermined level, and placed in the second form of the second connection state when the battery power remaining in the first mobile battery 9A is less than the predetermined level.

With the configuration, the on-board battery 8 and the prioritized mobile battery 9 can be accessed from the same position or from positions close to each other. This makes it easy to access the prioritized mobile battery 9.

The working vehicle 1 may further include a controller 28 configured or programmed to control operation of the relay 27. The controller 28 may be configured or programmed not to switch the relay 27 between the first connection state and the second connection state while the traveling device 3 is driven.

The configuration makes it possible to prevent the working vehicle 1, while traveling, from stopping due to the switching between the first connection state and the second connection state.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
   a vehicle body;
   a traveling device which supports the vehicle body such that the vehicle body is allowed to travel;
   an electric motor to drive the traveling device, the electric motor being provided on the vehicle body; and
   a plurality of batteries to store electric power to be supplied to the electric motor, wherein the plurality of batteries include an on-board battery fixed to the vehicle body and a mobile battery detachably attached to the vehicle body;

the working vehicle further comprises a switching mechanism configured to be selectively placed in a first state in which electric power is supplied from the on-board battery to the electric motor or a second state in which electric power is supplied from the mobile battery to the electric motor;

the switching mechanism includes
  a first output cable electrically connected to the on-board battery,
  a second output cable configured to be electrically connected to the mobile battery,
  a supply cable electrically connected to the electric motor, and
  a relay configured to be selectively placed in a first connection state in which the relay electrically connects the first output cable and the supply cable to each other or a second connection state in which the relay electrically connects the second output cable and the supply cable to each other;

a plurality of the mobile batteries are detachably attached to the vehicle body;

the plurality of mobile batteries include a first mobile battery and a second mobile battery;

the switching mechanism includes a plurality of the second output cables including a first cable configured to be electrically connected to the first mobile battery and a second cable configured to be electrically connected to the second mobile battery;

the relay is configured to be selectively placed in a first form of the second connection state in which the relay electrically connects the first cable and the supply cable to each other or a second form of the second connection state in which the relay electrically connects the second cable and the supply cable to each other;

the first mobile battery is detachably attached closer to the on-board battery than the second mobile battery is to the on-board battery; and the relay is placed in the first form of the second connection state when battery power remaining in the first mobile battery is equal to or greater than a predetermined level, and is placed in the second form of the second connection state when the battery power remaining in the first mobile battery is less than the predetermined level.

2. The working vehicle according to claim 1, wherein:
the switching mechanism includes
  a first output connector electrically connected to the on-board battery,
  a plurality of second output connectors electrically connected to the first and second mobile batteries, and
  an input connector electrically connected to the electric motor; and
the input connector is configured to be selectively connected to the first output connector or one or more of the plurality of second output connectors.

3. The working vehicle according to claim 2, wherein:
the switching mechanism includes a junction cable for supply of electric power from one or more of the plurality of second output connectors to the input connector; and
the junction cable is provided with a first junction connector and a plurality of second junction connectors, the first junction connector being configured to be connected to the input connector, the plurality of second junction connectors being configured to be connected to the respective plurality of second output connectors.

4. The working vehicle according to claim 1, wherein:
the plurality of second output cables are configured to be electrically connected to the plurality of mobile batteries.

5. The working vehicle according to claim 1, further comprising:
one or more mounts to have one or more of the mobile batteries detachably attached thereto, the one or more mounts being disposed at at least one of: a position in front of the vehicle body; a position behind the vehicle body; a position inside a hood on the vehicle body; a position below a seat on the vehicle body; a roof above the seat; an upper portion of a cargo bed on the vehicle body; and a position below the cargo bed.

6. The working vehicle according to claim 1, wherein:
the first mobile battery is detachably attached to an upper portion of a cargo bed on the vehicle body;
the second mobile battery is detachably attached to a position other than the upper portion of the cargo bed; and
the relay is placed in the first form of the second connection state when the battery power remaining in the first mobile battery is equal to or greater than the predetermined level, and is placed in the second form of the second connection state when the battery power remaining in the first mobile battery is less than the predetermined level.

7. The working vehicle according to claim 1, wherein:
the first mobile battery is detachably attached to a position inside a hood on the vehicle body;
the second mobile battery is detachably attached to a position not inside the hood; and
the relay is placed in the first form of the second connection state when the battery power remaining in the first mobile battery is equal to or greater than the predetermined level, and is placed in the second form of the second connection state when the battery power remaining in the first mobile battery is less than the predetermined level.

8. The working vehicle according to claim 1, further comprising:
a controller configured or programmed to control operation of the relay, wherein
the controller does not switch the relay between the first connection state and the second connection state while the traveling device is driven.

9. A working vehicle comprising:
a vehicle body;
a traveling device which supports the vehicle body such that the vehicle body is allowed to travel;
an electric motor to drive the traveling device, the electric motor being provided on the vehicle body;
a plurality of batteries to store electric power to be supplied to the electric motor, the plurality of batteries including an on-board battery fixed to the vehicle body and a plurality of mobile batteries detachably attached to the vehicle body; and
a switching mechanism, wherein
the plurality of mobile batteries include a first mobile battery and a second mobile battery;
the first mobile battery is detachably attached closer to the on-board battery than the second mobile battery is to the on-board battery; and the switching mechanism is configured to be selectively placed in one state in which the switching mechanism electrically connects the first mobile battery and the electric motor to each other or another state in which the switching mechanism electrically connects the second mobile battery and the electric motor to each other, and is configured to be placed in the one state when battery power remaining in the first mobile battery is equal to or greater than a predetermined level and placed in the other state when the battery power remaining in the first mobile battery is less than the predetermined level to use the first mobile battery in priority to the second mobile battery.

10. A tractor comprising:

a vehicle body;

a traveling device which supports the vehicle body such that the vehicle body is allowed to travel;

an electric motor to drive the traveling device, the electric motor being provided on the vehicle body; and a plurality of batteries to store electric power to be supplied to the electric motor, wherein the plurality of batteries include an on-board battery fixed to the vehicle body and a mobile battery detachably attached to the vehicle body;

the tractor further comprises a mount to have the mobile battery detachably attached thereto; and the mount is provided at a position which is on a front portion of a vehicle body frame, which is outside a hood provided on the vehicle body, which is in front of the hood, and which is lower than the hood.

* * * * *